US012803201B2

(12) United States Patent
Huang et al.

(10) Patent No.: US 12,803,201 B2
(45) Date of Patent: Nov. 17, 2026

(54) CONNECTING CABLE WITH RETURNABLE PROTECTIVE COVER

(71) Applicants: KUNSHAN AMPHENOL ZHENGRI ELECTRONICS CO., LTD., Kunshan City (CN); AMPHENOL LTW TECHNOLOGY CO., LTD., New Taipei City (TW)

(72) Inventors: Shang-Yen Huang, New Taipei City (TW); Mei-Chi Chou, New Taipei City (TW)

(73) Assignees: KUNSHAN AMPHENOL ZHENGRI ELECTRONICS CO., LTD., Kunshan City (CN); AMPHENOL LTW TECHNOLOGY CO., LTD., New Taipei City (TW)

( * ) Notice: Subject to any disclaimer, the term of this patent is extended or adjusted under 35 U.S.C. 154(b) by 418 days.

(21) Appl. No.: 18/528,717

(22) Filed: Dec. 4, 2023

(65) Prior Publication Data

US 2025/0132512 A1 Apr. 24, 2025

(30) Foreign Application Priority Data

Oct. 18, 2023 (TW) ................................ 112139761

(51) Int. Cl.
*H01R 12/79* (2011.01)
*H01R 12/77* (2011.01)

(52) U.S. Cl.
CPC ........... *H01R 12/79* (2013.01); *H01R 12/774* (2013.01)

(58) Field of Classification Search
CPC .............................. H01R 12/79; H01R 12/774
See application file for complete search history.

(56) References Cited

U.S. PATENT DOCUMENTS 7,393,221 B2 * 7/2008 Feng ...................... H01R 27/00 439/155
7,794,281 B2 * 9/2010 Matsumoto ............ G06K 13/08 439/630

(Continued)

FOREIGN PATENT DOCUMENTS

JP H06349543 A 12/1994
JP 2003092160 A 3/2003

(Continued)

OTHER PUBLICATIONS

Search Report dated Jun. 5, 2024 of the corresponding European patent application No. EP23214804.9.

(Continued)

*Primary Examiner* — Thanh Tam T Le
(74) *Attorney, Agent, or Firm* — HDLS IPR SERVICES; Chun-Ming Shih

(57) ABSTRACT

A connecting cable includes an insulative seat, a circuit board, a protective cover and a spring. The insulative seat includes a body. The body is formed with a slot and a conducting opening. The circuit board includes a substrate and conductive portions. The substrate is inserted into the slot. The conductive portions are exposed from the conducting opening. The protective cover is disposed on the body to cover the conducting opening and slidable. The spring has one end abutting against the body and another end fixed on the protective cover. The conducting opening may be opened by pushing the protective cover by the counterpart connector to compress the spring. The protective cover may be returned back to an original position by an elastic force from the spring.

7 Claims, 8 Drawing Sheets

(56) References Cited

U.S. PATENT DOCUMENTS

| | | | | |
|---|---|---|---|---|
| 8,251,720 | B2 * | 8/2012 | Yu | G06K 13/08 439/159 |
| 8,382,498 | B2 * | 2/2013 | Yu | G06K 7/0021 439/159 |
| 8,529,298 | B2 * | 9/2013 | Zhu | G06K 13/08 439/607.22 |
| 8,597,057 | B2 * | 12/2013 | Yu | H01R 13/635 439/159 |
| 8,608,494 | B2 * | 12/2013 | Yang | H01R 12/7094 439/159 |
| 8,657,611 | B1 * | 2/2014 | Lin | G06K 13/0831 439/159 |
| 8,740,634 | B2 * | 6/2014 | Uesaka | H01R 13/2442 439/159 |
| 10,265,256 | B2 * | 4/2019 | Glenn, Jr. | A61Q 5/12 |
| 10,270,191 | B1 * | 4/2019 | Li | H01R 12/771 |
| 11,264,743 | B2 * | 3/2022 | Meng | H01R 12/772 |
| 2004/0224555 | A1 | 11/2004 | Singh et al. | |
| 2009/0137138 | A1 | 5/2009 | Ohsumi | |
| 2017/0310029 | A1 | 10/2017 | Lee et al. | |
| 2020/0185849 | A1 * | 6/2020 | Chi | H01R 12/79 |

FOREIGN PATENT DOCUMENTS

| | | | |
|---|---|---|---|
| JP | 2003346996 | A | 12/2003 |
| JP | 2007305537 | A | 11/2007 |
| JP | 2020140779 | A | 9/2020 |

OTHER PUBLICATIONS

Office Action dated Oct. 15, 2024 of the corresponding Japan patent application No. 2023-198405.

* cited by examiner

CONNECTING CABLE WITH RETURNABLE PROTECTIVE COVER

BACKGROUND

Technical Field

The disclosure relates to a connecting cable, particularly a connecting cable with a returnable protective cover.

Related Art

A connecting cable is a mechanical or electronic component used to connect different parts, devices or systems. In addition, connecting cables are applied to connection of electronic, electrical or data between various devices, systems or components. Connecting cable plays a vital role in modern technology and communications.

Furthermore, a specially designed cable or connecting wire available in the market is a flat cable made of flexible printed circuit (FPC), which can be used for connections in narrow spaces or used for flexibility and anti-bending requirements.

The metal conductive portion (gold finger) of the aforementioned connecting cable with a flexible printed circuit is exposed from the bottom side of the insulative base for electric connection when connecting. However, the exposed metal conductive portion may be accidentally touched by a user to cause damage. In addition, there also is a risk of being damaged by touch when connecting with a board-end connector.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to provide a connecting cable with a returnable protective cover, which can prevent the conductive portion of the connecting cable from being damaged by touch to increase reliability, durability and safety.

To accomplish the above object, the disclosure provides a connecting cable with a returnable protective cover, which includes an insulative seat, a circuit board, a protective cover and a spring. The insulative seat includes a body. The body is formed with a slot and a conducting opening. The conducting opening communicates with the slot and is located on the bottom of the body. The circuit board includes a substrate and conductive portions disposed on the substrate. The substrate is inserted into the slot. The conductive portions are exposed from the conducting opening. The protective cover is slidably connected on the body and cloaks the conducting opening. One end of the spring connects with the body, and another end thereof is fixed on the protective cover. The protective cover is pushed by the counterpart connector to compress the spring and be exposed from the conducting opening. The protective cover returns back to an original position by an elastic reverting force from the spring.

In an embodiment of the disclosure, the body includes an elastic arm and a bump disposed on the elastic arm, the counterpart connector is disposed with an engaging trough, and the connecting cable is connected to the counterpart connector by embedding the bump into the engaging trough.

In an embodiment of the disclosure, the substrate is a flexible substrate, and each conductive portion is a gold finger.

In an embodiment of the disclosure, the protective cover includes a covering plate and two frame arms connected to the covering plate, each frame arm is extended and bent from a side of the covering plate to enclose an inserting space, and two sides of the body are respectively inserted into the inserting spaces.

In an embodiment of the disclosure, each frame arm includes a side plate connected with the covering plate and a top plate extended and bent from the side plate, one end of the side plate is disposed with a latching piece, and the latching piece latches the body.

In an embodiment of the disclosure, each frame arm is extended with a separation piece from the top plate in a direction toward the inserting space, a through slot is formed between the separation piece and the top plate, and the spring is inserted into the through slot.

In an embodiment of the disclosure, each frame arm has a blocking piece extended and bent from the top plate in a direction far away from the through slot, and the blocking piece is in contact with an outer surface of the body.

In an embodiment of the disclosure, the body includes a blocker, and the blocker is inserted into the through slot.

In an embodiment of the disclosure, the protective cover includes a pin, an end of the spring abuts against the blocker, and another end thereof is disposed around the pin.

In an embodiment of the disclosure, the pin is extended from an end of the top plate and bent to reach into the through slot.

In comparison with related art, the connecting cable with a returnable protective cover of the disclosure has the conductive portions exposed from the conducting opening on the bottom of the insulative seat, and the protective cover is connected to the body and slidable so as to cover the conducting opening, thereby preventing the conductive portion of the connecting cable from damage caused by touching. Also, when the connecting cable is inserted into the counterpart connector, the protective cover is pushed by the counterpart connector to compress the spring so as to open the conducting opening. At this time, the conductive portions in the conducting opening are electrically connected with the terminals of the counterpart connector so as to implement electronic, electrical or data connections. In addition, when the connecting cable is removed from the counterpart connector, the protective cover will return back to the original position by an elastic reverting force from the spring so as to cloak the conductive portions on the substrate again to increase reliability, durability and safety of the connecting cable to increase utility of the disclosure.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
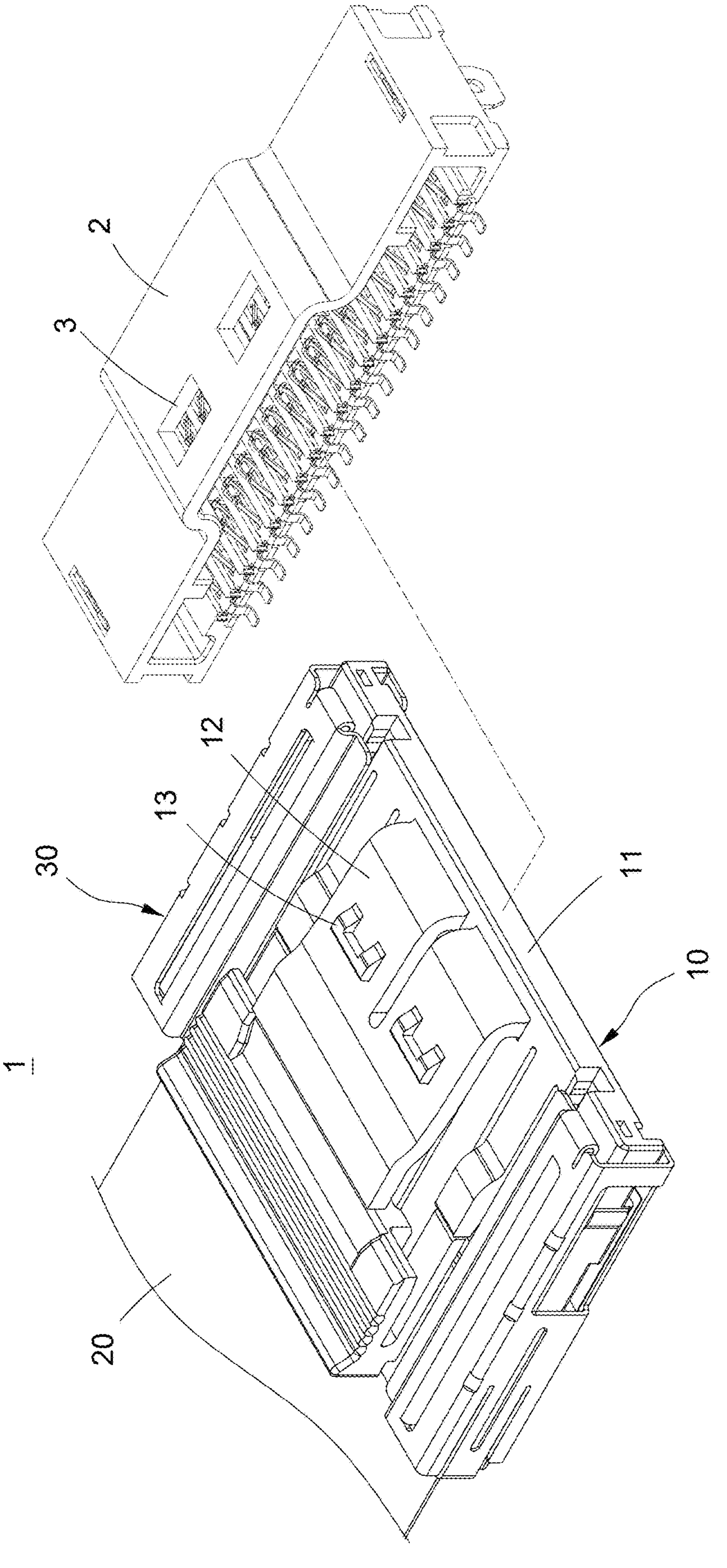
FIG. 1 is a schematic view of connection of the connecting cable with a returnable protective cover of the disclosure.
Figure 2:
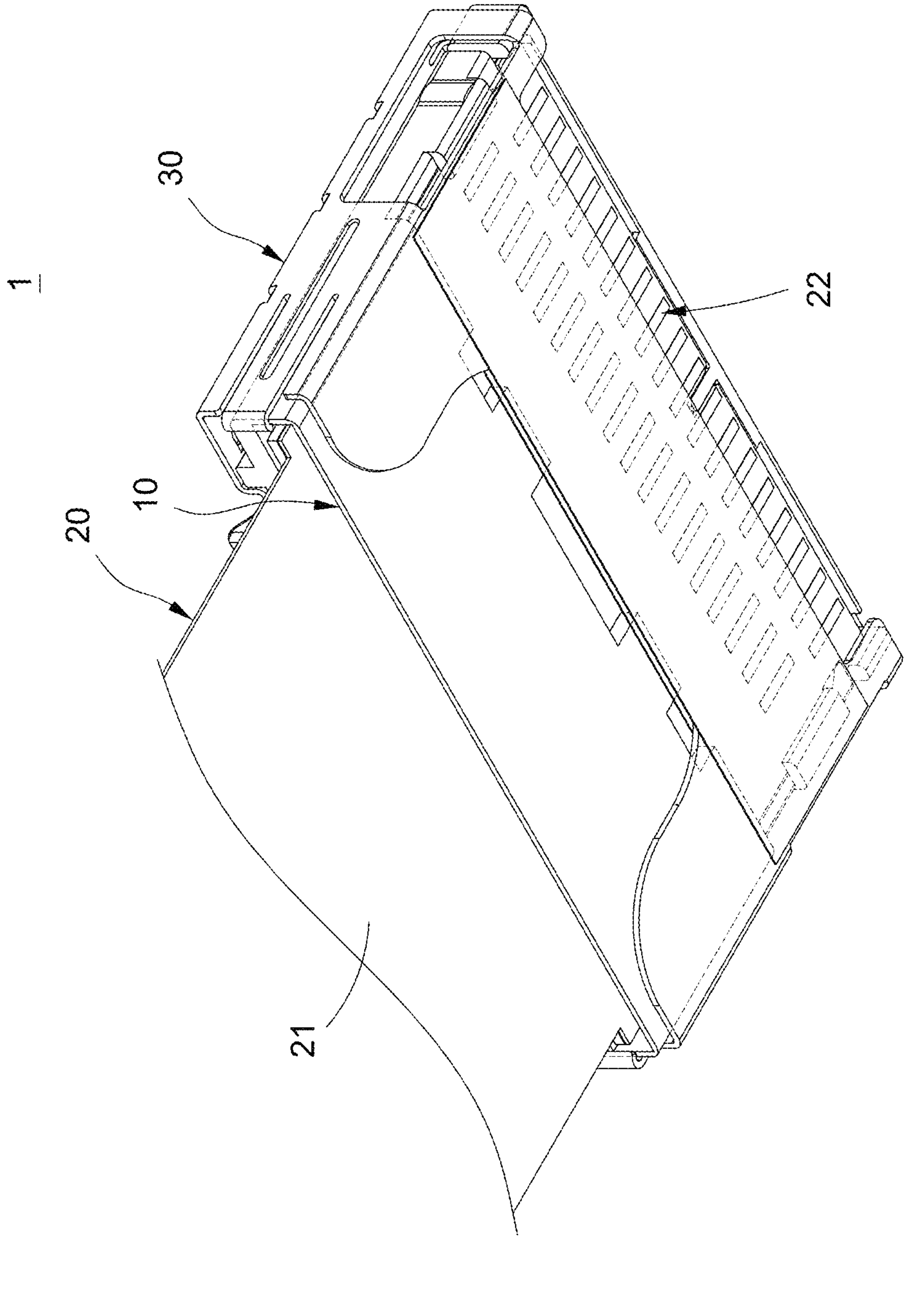
FIG. 2 is a perspective schematic view of the connecting cable with a returnable protective cover of the disclosure.

Please refer to FIGS. 1 and 2, which are a schematic view of connection of the connecting cable with a returnable protective cover of the disclosure and a perspective schematic view of the connecting cable with a returnable protective cover of the disclosure, respectively. The disclosure provides a connecting cable 1 with a returnable protective cover, used for connecting a counterpart connector 2. Also, in practice, the counterpart connector 2 may be disposed on, but not limited to, a circuit board.

In the embodiment, the connecting cable 1 includes an insulative seat 10, a circuit board 20 and a protective cover 30. The circuit board 20 includes a substrate 21 and multiple conductive portions 22 disposed on the substrate 21. The substrate 21 is combined in the insulative seat 10. The conductive portions 22 are exposed on the bottom 10 of the insulative seat 10.

Also, the protective cover 30 is combined on the insulative seat 10 to cover the conductive portions 22 at the bottom of the insulative seat 10.

In an embodiment of the disclosure, the insulative seat 10 includes a body 11, an elastic arm 12 and a bump 13 disposed on the elastic arm 12. On the other hand, the counterpart connector 2 is disposed with an engaging trough 3. As a result, when the connecting cable 1 is inserted into the counterpart connector 2, the connecting cable 1 can be connected to the counterpart connector 2 via latching the engaging trough 3 by the bump 13.

Figure 3:
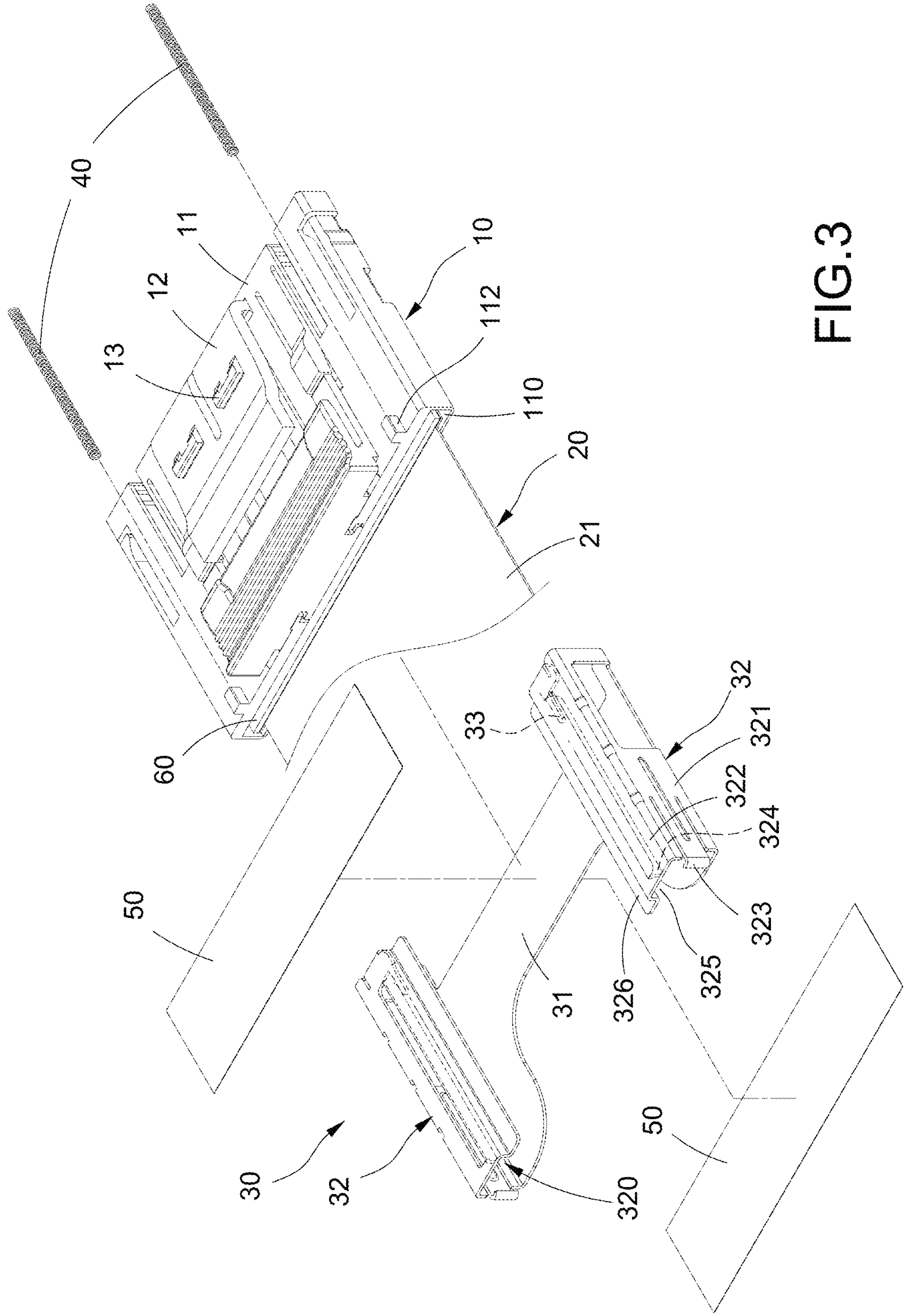
FIGS. 3 and 4 are exploded schematic views of the connecting cable with a returnable protective cover of the disclosure from different angles.
Figure 4:
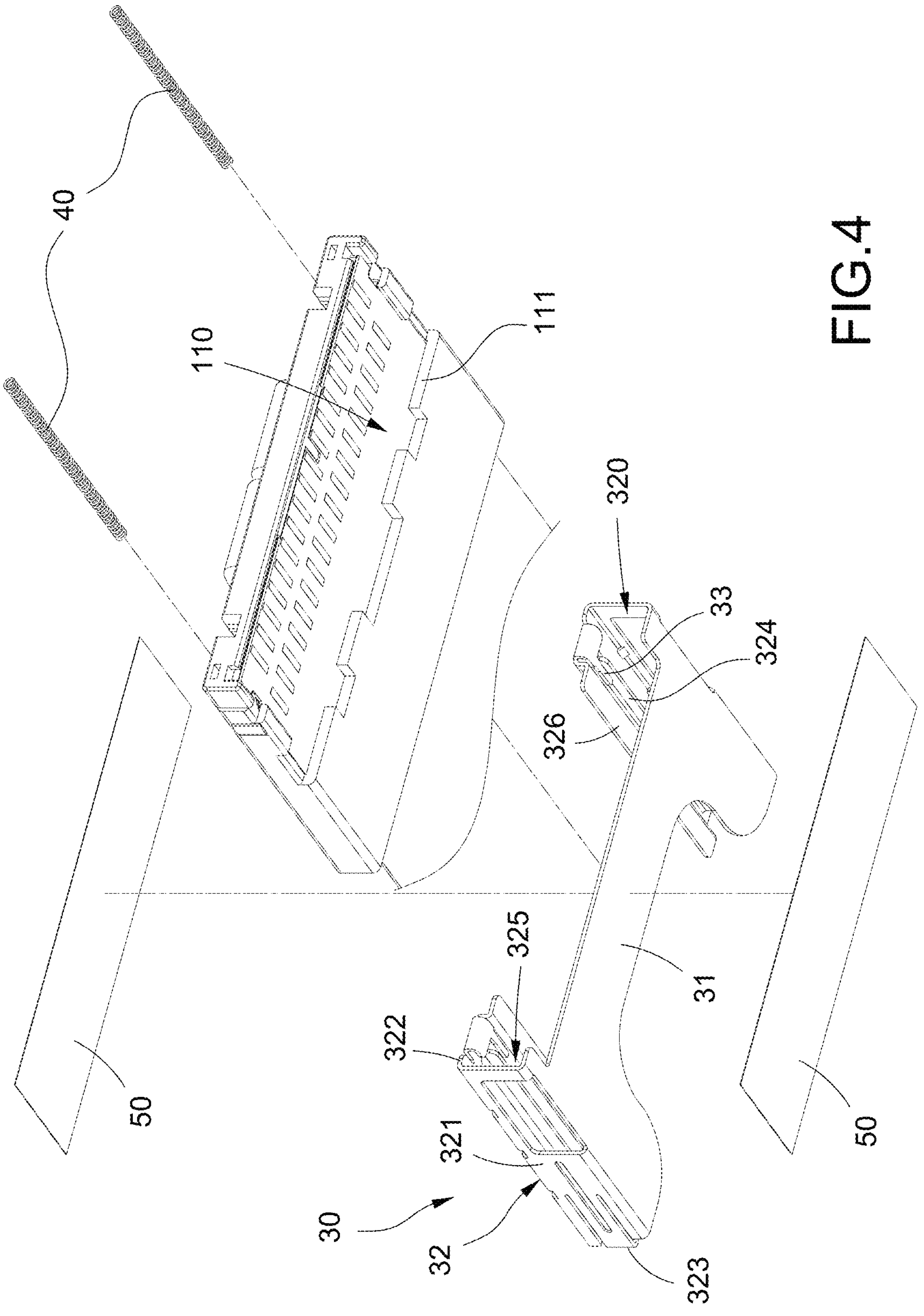
Figure 5:
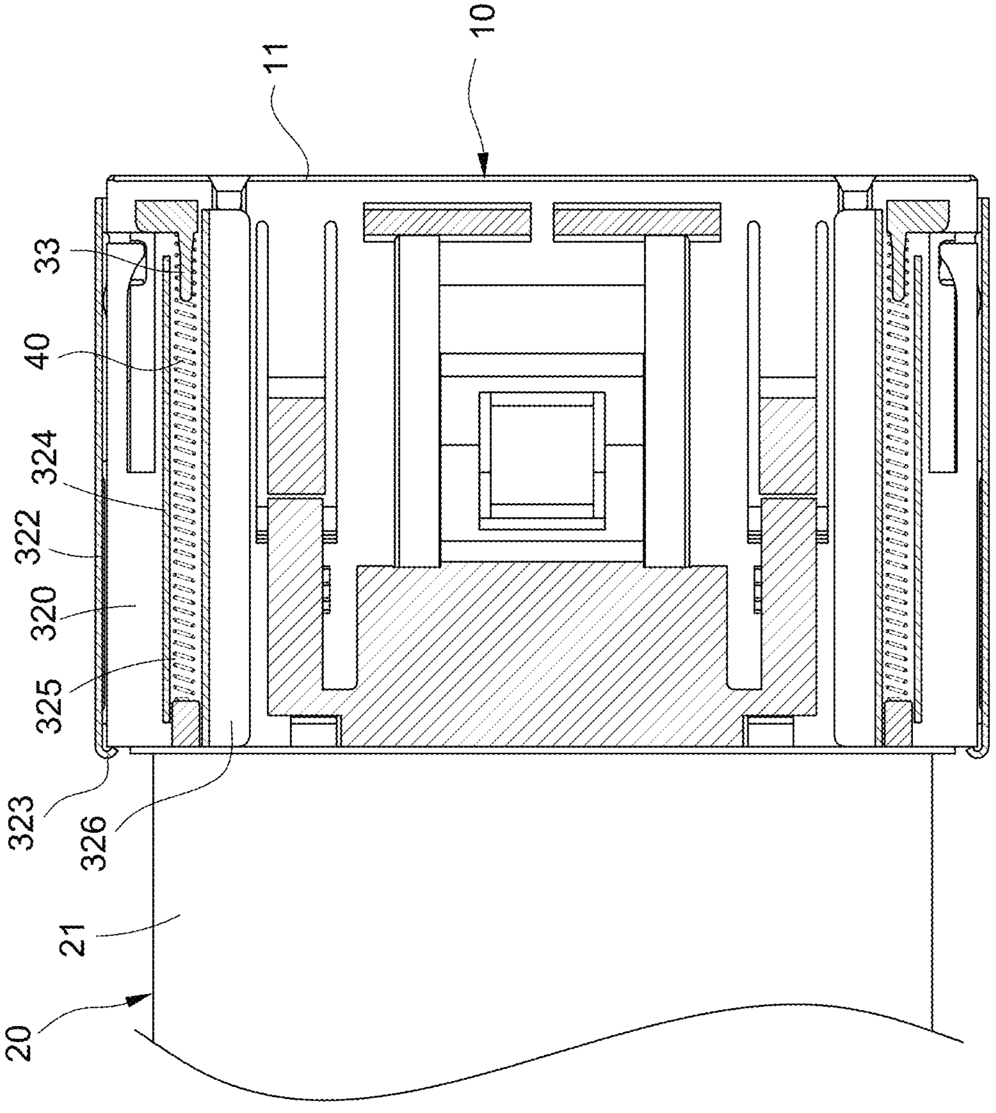
FIG. 5 is an assembled cross-sectional view of the connecting cable with a returnable protective cover of the disclosure.

Please refer to FIGS. 3-5 showing the connecting wire with a returning protective cover of the disclosure of this disclosure, which are exploded views at viewpoints from two sides and a cross-sectional view in an assembled status. The connecting cable 1 with the returnable protective cover of the disclosure includes an insulative seat 10, a circuit board 20, a protective cover 30 and a spring 40. The insulative seat 10 includes a body 11. The body 10 is formed with a slot 110 and a conducting opening 111. The conducting opening 111 is communicated with the slot 110 and located on the bottom of the body 11. In addition, the body 11 includes an elastic arm 12 and a bump 13 disposed on the elastic arm 12.

The circuit board 20 includes a substrate 21 and multiple conductive portions 22 disposed on the substrate 21. The substrate 21 is inserted in the slot 110. The conductive portions 22 are exposed from the conducting opening 111. In the embodiment, the substrate 21 is a flexible substrate. Also, each conductive portion 22 is configured to, but not limited to, a gold finger.

Further, the protective cover 30 is combined on the body 11 and slidable so as to cover the conducting opening 111. One end of the spring 40 abuts against the body 11, and another end thereof is fixed on the protective cover 30.

It is noted that, in the embodiment, the substrate 21 is disposed with two rows of conductive portions 22 at an interval. Also, when the protective cover 30 covers the conducting opening 111, each of conductive portions 22 may have most portions covered by the protective cover 30 and only a distal end of the conductive portions 22 exposed.

In detail, the protective cover 30 includes a covering plate 31 and two frame arms 32 connected to the covering plate 31. Each frame arm 32 is extended and bent from a side of the covering plate 31 to enclose an inserting space 320. Two sides of the body 11 are respectively inserted into the inserting spaces 320. It is noted that the protective cover 30 may be made of metal or plastic material depending on operation requirements.

In addition, each frame arm 32 includes a side plate 321 connected with the covering plate 31 and a top plate 322 extended and bent from the side plate 321. One end of the side plate 321 is disposed with a latching piece 323. Also, the latching piece 323 latches the body 11.

In detail, each frame arm 32 has a separation piece 324 extended from the top plate 322 in a direction toward the inserting space 320. A through slot 325 is formed between the separation piece 324 and the top plate 322. The spring 40 is inserted into the through slot 325. In addition, each frame arm 32 has a blocking piece 326 extended from the top plate 322 and bent in a direction far away from the through slot 325. Also, the blocking piece 326 latches an outer surface of the body 11.

Further, the body 11 has a blocker 112. The blocker 112 and the spring 40 are inserted into the through slot 325. Also, the protective cover 30 has a pin 33. An end of the spring 40 abuts against the blocker 112, and the other end is disposed around the pin 33 (referring to FIG. 5). In the embodiment, the pin 33 is extended from an end of the top plate 322 and bent to reach into the through slot 325.

In an embodiment of the disclosure, the connecting cable 1 includes multiple support plates 50 and an auxiliary plate 60. The support plates 50 are respectively disposed on two sides of the covering plate 31 to reinforce the structural strength of the covering plate 31. In addition, the auxiliary plate 60 is disposed in the substrate 21 and inserted into the front end of the slot 110 to reinforce the structural strength of the substrate 21 (referring to FIG. 6).

Figure 6:
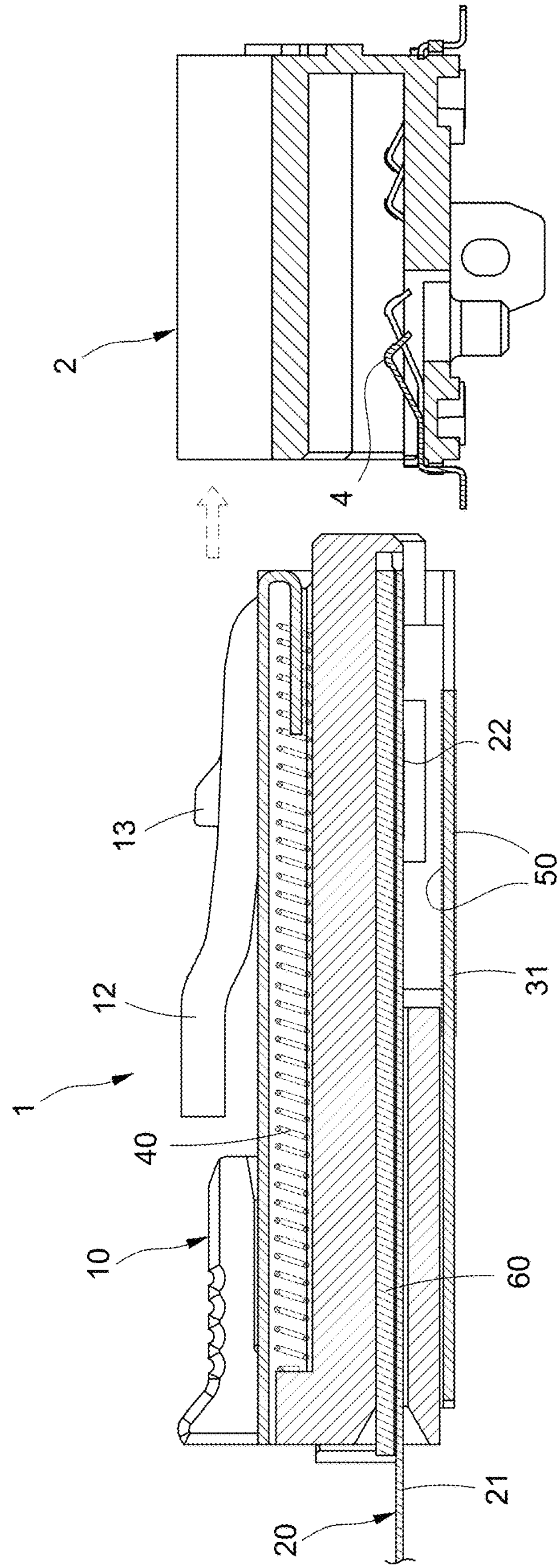
FIG. 6 is a schematic view of connection of connection of the connecting cable with a returnable protective cover of the disclosure and a counterpart connector.
Figure 7:
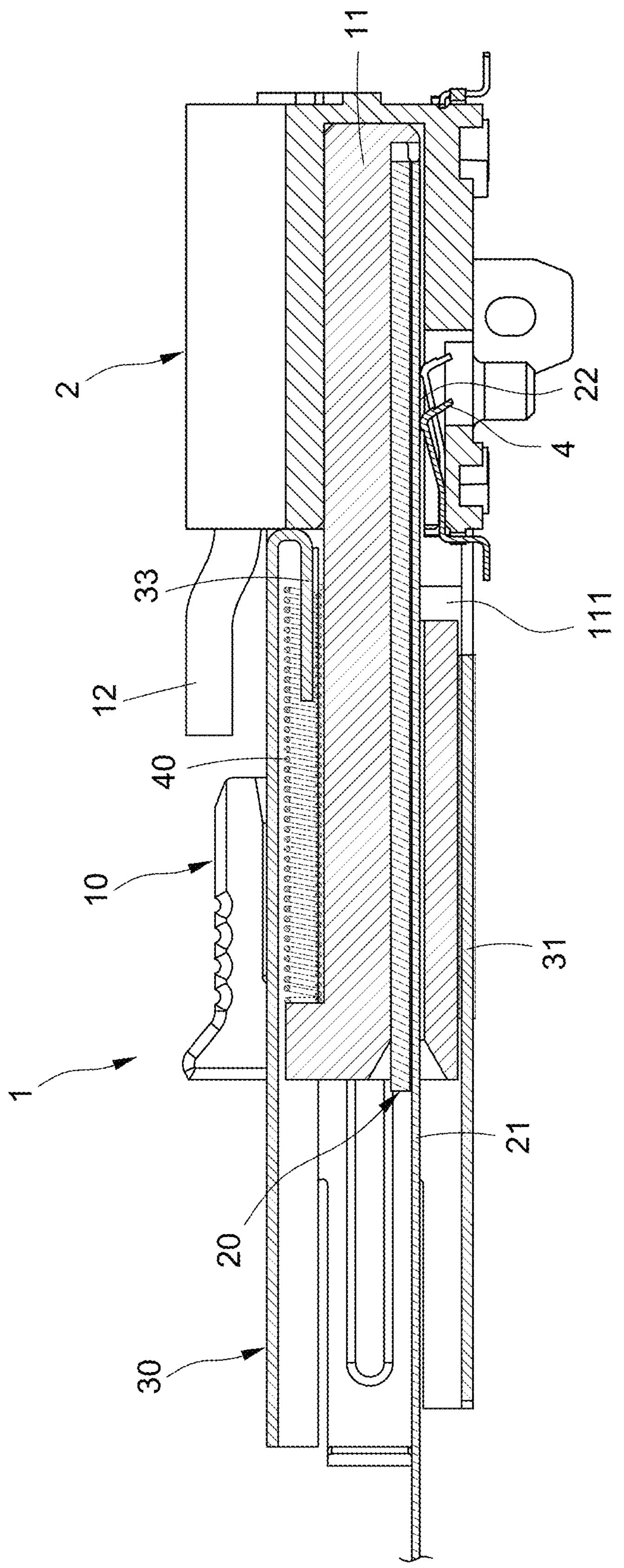
FIGS. 7 and 8 are cross-sectional views of the connecting cable with a returnable protective cover of the disclosure and a counterpart connector, which have been connected.
Figure 8:
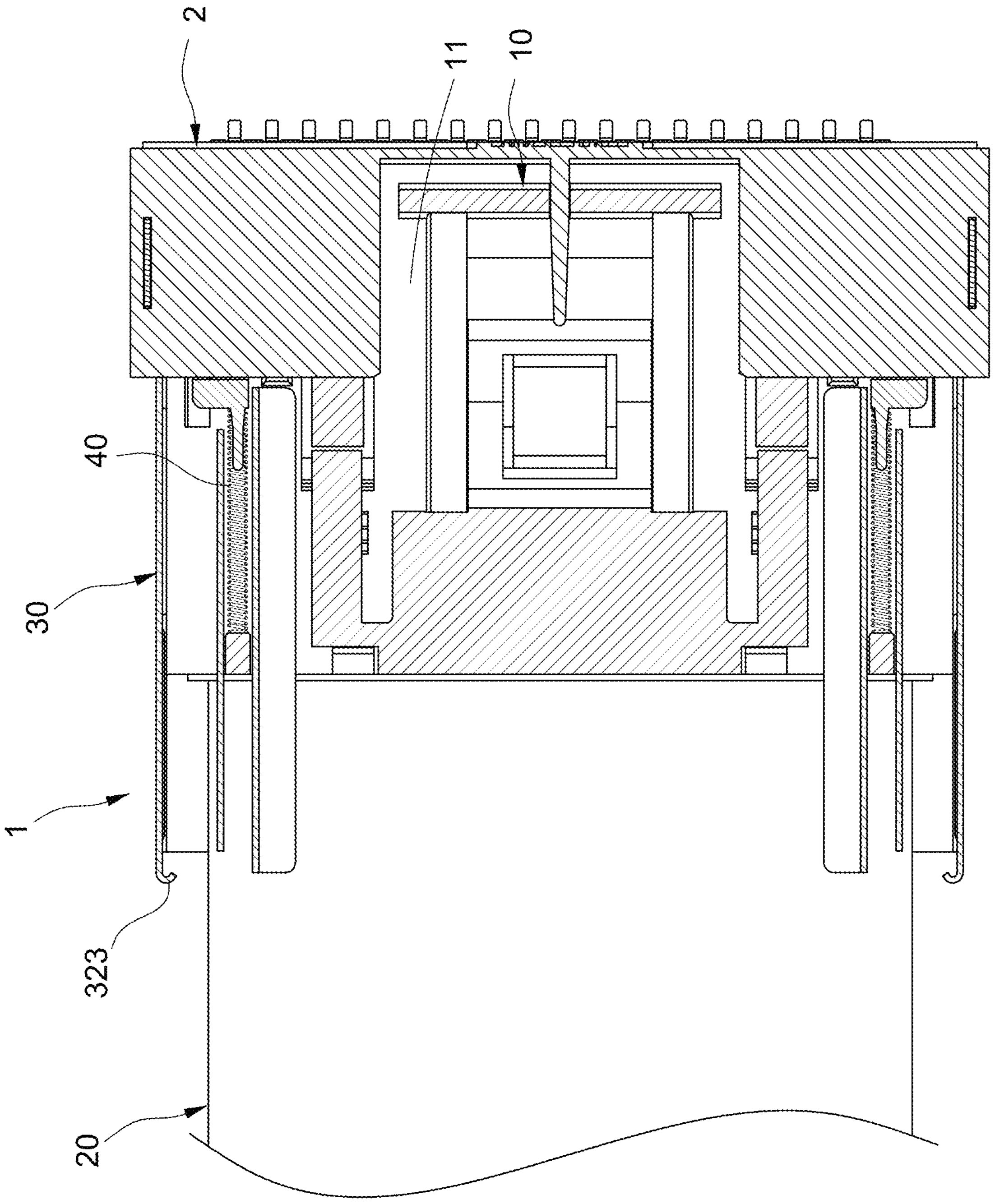

Please refer to FIGS. 6-8, which are a schematic view showing that the connecting cable with a returnable protective cover of the disclosure coupled with a counterpart connector and cross-sectional views in a coupled status at viewpoints from two sides. As shown in FIG. 6, the connecting cable 1 with a returnable protective cover of the disclosure is used to couple with a counterpart connector 2 with multiple terminals 4. When the connecting cable 1 is connected to the counterpart connector 2, the elastic arm 12 is pressed to move toward the body 11 and the engaging trough 3 will be latched by the bump 13 so as to connect the cable 1 with the counterpart connector 2 (referring to FIG. 1)

As shown in FIGS. 7 and 8, when the connecting cable 1 is inserted into the counterpart connector 2, the protective cover 30 is pushed by the counterpart connector 2 to compress the spring 40 and be exposed from the conducting opening 111. At this time, the conductive portions 22 in the conducting opening 111 are electrically connected with the terminals 4 of the counterpart connector 2 so as to implement electronic, electrical or data connections.

In addition, when the body 11 of the connecting cable 1 is detached from the counterpart connector 2, the protective cover 30 will return back to the original position by an elastic reverting force from the spring 40 so as to cover the conductive portions 22 on the substrate 21 again.

It is noted that the protective cover 30 is provided for sheathing the body 11 and protecting the conductive portions 22 of the circuit board 20. Also, besides the protective cover 30 can protect the conductive portions 22 of the circuit 20 when no connecting, it maintains a protection to the conductive portions 22 during the coupling process of connecting the connecting cable 1 to the counterpart connector 2. In addition, by the spring 40, the protective cover 30 can be returned to the original position when the connecting cable 1 is detached from the counterpart connector 2.

While this disclosure has been described by means of specific embodiments, numerous modifications and variations could be made thereto by those skilled in the art without departing from the scope and spirit of this disclosure set forth in the claims.

What is claimed is:

1. A connecting cable used for connecting a counterpart connector, comprising:

an insulative seat, comprising a body, comprising a slot and a conducting opening formed thereon, and the conducting opening communicating with the slot and located on a bottom of the body;

a circuit board, comprising a substrate and multiple conductive portions disposed on the substrate, the substrate being inserted into the slot, and the conductive portions being exposed from the conducting opening;

a protective cover, assembled on the body to cover the conducting opening and slidable; and a spring, comprising one end abutting against the body and another end fixed on the protective cover;

wherein when the protective cover is pushed by the counterpart connector to compress the spring and open the conducting opening, the protective cover is returned back to an original position by an elastic reverting force from the spring;

wherein the protective cover comprises a covering plate and two frame arms connected to the covering plate, each frame arm is extended from a side of the covering plate and bent to formed with an inserting space, and two sides of the body are inserted into the inserting spaces respectively;

wherein each frame arm comprises a side plate connected with the covering plate and a top plate extended and bent from the side plate, one end of the side plate is disposed with a latching piece, and the latching piece latches the body;

wherein each frame arm is extended with a separation sheet from the top plate in a direction toward the inserting space, a through slot is formed between the separation sheet and the top plate, and the spring is inserted into the through slot.

2. The connecting cable of claim 1, wherein the body comprises an elastic arm and a bump disposed on the elastic arm, the counterpart connector is disposed with an engaging trough, and the connecting cable is connected to the counterpart connector by embedding the bump into the engaging trough.

3. The connecting cable of claim 1, wherein the substrate is a flexible substrate, and each conductive portion is a gold finger.

4. The connecting cable of claim 1, wherein each frame arm is bendingly extended with a blocking piece from the top plate in a direction far away from the through slot, and the blocking piece is in contact with an outer surface of the body.

5. The connecting cable of claim 1, wherein the body comprises a blocker, and the blocker is inserted into the through slot.

6. The connecting cable of claim 5, wherein the protective cover comprises a pin, an end of the spring abuts against the blocker, and another end thereof is disposed around the pin.

7. The connecting cable of claim 6, wherein the pin is extended from an end of the top plate and bent to reach into the through slot.

* * * * *